United States Patent [19]

Bartell

[11] 4,206,938
[45] Jun. 10, 1980

[54] HOSE SHEAR COUPLING

[75] Inventor: Jeffrey M. Bartell, Rome, N.Y.

[73] Assignee: The Goodyear Tire & Rubber Company, Akron, Ohio

[21] Appl. No.: 929,378

[22] Filed: Jul. 31, 1978

[51] Int. Cl.² .................................................. F16L 35/04
[52] U.S. Cl. .................................................. 285/2; 285/5
[58] Field of Search .................. 285/1, 2, 3, 4, 5, 6, 285/320, 312, 87, 88; 403/2, 41; 29/237; 254/29 R

[56] References Cited

U.S. PATENT DOCUMENTS

| | | | |
|---|---|---|---|
| 1,315,969 | 9/1919 | Kienzle | 403/2 |
| 2,196,622 | 4/1940 | Bean | 285/363 X |
| 2,830,830 | 4/1958 | Jacobs et al. | 285/6 |
| 3,499,664 | 3/1970 | Burns | 285/2 |
| 3,602,065 | 8/1971 | Ratcliff | 403/2 |
| 3,695,632 | 10/1972 | Kruse | 285/5 |
| 3,830,525 | 8/1974 | Ransford | 285/2 |

Primary Examiner—Dave W. Arola
Attorney, Agent, or Firm—D. M. Ronyak

[57] ABSTRACT

An external hose coupling member is adapted with a pair of pulling ears which when subjected to forces exceeding a predetermined threshold for the particular hose, will disengage the pulling chains and save the hose from damage. The ears are adapted to rotate from a pull engaging position to a disengaging position by means of shear pins that will hold the engaging position until the predetermined threshold for the hose is reached whereupon the pins will shear and rotate to their disengaging positions.

9 Claims, 8 Drawing Figures

U.S. Patent  Jun. 10, 1980  4,206,938
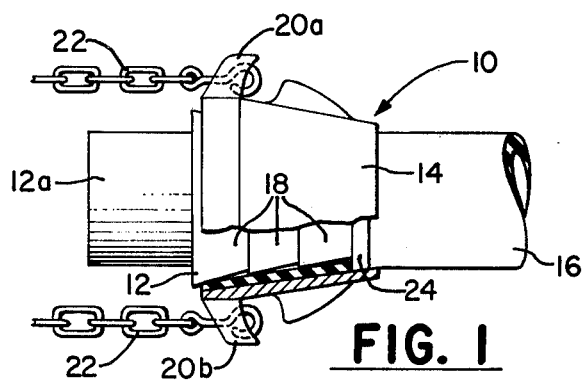
FIG. 1
PRIOR ART
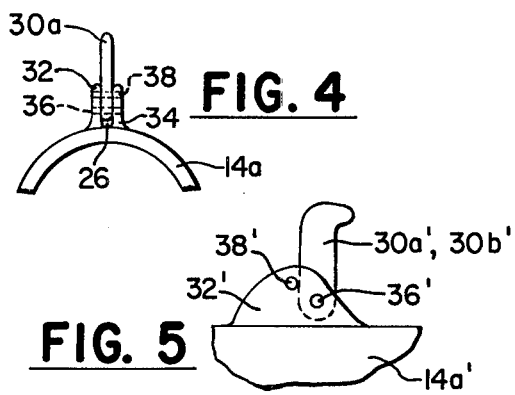
FIG. 4
FIG. 5
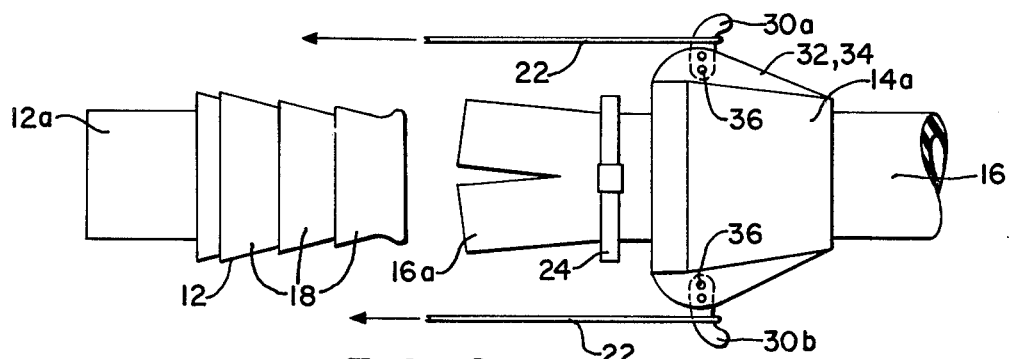
FIG. 2
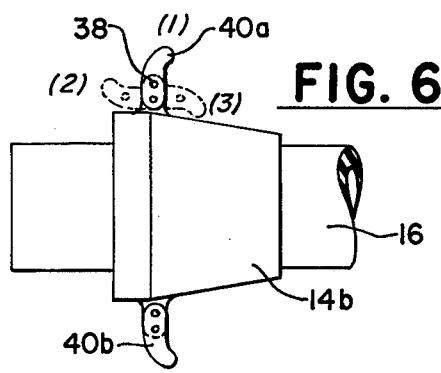
FIG. 6
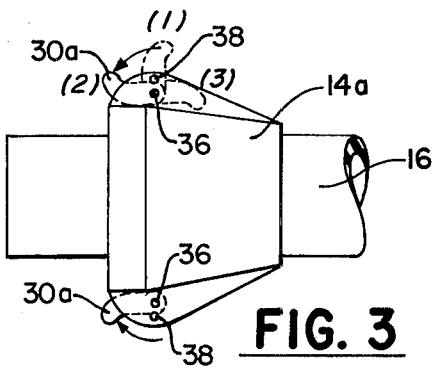
FIG. 3
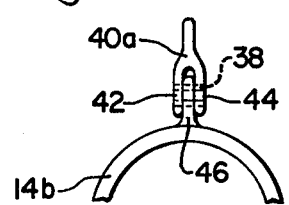
FIG. 7
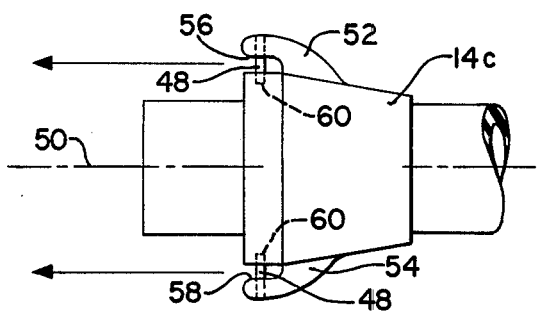
FIG. 8

HOSE SHEAR COUPLING

BACKGROUND OF THE INVENTION

This invention relates to hose coupling and more specifically to a coupler for large bore flexible hose that eliminates damaging of the hose and/or coupler when the hose is pulled.

In irrigation systems wherein long lengths of large bore hose are used it is the common practice to pull the hose by means of radially extending "ears" on a coupling member to allow for ease in handling when coupling two long lengths together and also when moving the hose lengths from one location to another. This pulling operation results in high tensile forces being imparted to the hose structure and when these forces exceed the ultimate strength of the hose it is damaged and ruptures when subjected to fluid pressure.

The disadvantages and shortcomings of the hose pulling practice are overcome by this invention wherein an external coupling member is adapted with a pair of ears which when subjected to forces exceeding a predetermined threshold for the particular hose, will disengage the pull chain and thus save the hose from damage. The ears are adapted to rotate from a pull engaging position to a disengaging position by reason of pivot pins and are held in their engaging position by means of shear pins or the like that will hold the engaging position until the predetermined threshold for the hose is reached whereupon the pins will shear.

DESCRIPTION OF THE DRAWINGS

The advantages of the invention will become more apparent upon considering the following detailed description and by reference to the accompanying drawings in which:

FIG. 1 is an elevational view partially broken away of a prior art coupling member showing radially extending ears to facilitate hose pulling in accordance with a common practice in the art;

FIG. 2 is an elevational view illustrating the various coupling elements and hose pulling means in accordance with this invention;

FIG. 3 is a side elevational view of the coupling member of FIG. 2 showing various positions of the pulling means;

FIG. 4 is a partial end elevational view of the coupling member of FIG. 3;

FIG. 5 is a partial side elevational view of an alternate embodiment of the pulling means shown in FIG. 3;

FIG. 6 is a side elevational view of another embodiment of the invention similar to that shown in FIG. 3;

FIG. 7 is a partial end elevational view of the coupling member illustrated in FIG. 6; and FIG. 8 is a side elevational view of a coupling member showing still another embodiment of the invention;

BRIEF DESCRIPTION OF THE INVENTION

Referring to FIG. 1 a hose coupler in accordance with the prior art is illustrated and generally indicated by reference numeral 10. The coupler generally includes a pair of mating frusto-conical members 12 and 14 that couple a hose 16 therein by reason of the wedging action imparted by the exterior frusto-conical surface of the male member 12 and the interior frusto-conical surface of the female member 14. The male member 12 is generally characterized by ribs 18 on the frusto-conical surface and a cylindrical stem portion 12a that is received into a standard female hose fitting (not shown) in a conventional manner. The female coupling member 14 is generally characterized by a smooth frusto-conical bore surface and a pair of radially extending "ears" 20a, 20b that are adapted for receiving a pull chain 22 or the like used in pulling of the hose section in the well known manner. As illustrated in FIG. 2 of the drawings, the hose end 16a is usually split to fit over the male member 12 and a band clamp 24 secures it on the member 12 in a leakproof connection.

Referring now to FIGS. 2, 3 and 4 a female coupling member is indicated by reference numeral 14a that is adapted with pulling ears 30a and 30b in accordance with the teaching of this invention. The ears 30a, 30b are mounted in a slot 26 formed by a pair of uprights 32, 34 that are welded or otherwise formed on the coupling member 14a. The ears 30a, 30b are shaped to receive the pullchain connecting means (hook etc) 22 and it is anticipated that many and various shapes may be applied to the ears. The base of the ears however, should be shaped to be received by the uprights so that they rotate through an approximate angle of 180 degrees as shown in FIG. 3. To facilitate the ear rotation, pivot pins 36 are inserted through the uprights 32, 34 and the base of the ear. Thus the ears may rotate from a first position (1), to either of two alternate positions (2) or (3) as indicated.

As clearly illustrated in FIG. 3 position (1) is the upright position and the only position in which the ear will accept a hook or other pull means, positions (2) and (3) being lay down positions. Now therefore, and so that the ears may be set in position (1) for pulling, a second pin 38 is inserted through the uprights 32, 34 and the base of the ear in a spaced location from the pivot pin 36 and this pin is designed to shear at a predetermined pull force exerted on the ear. Shear pins are generally well known to the mechanic, however, the pins 38 of this invention are designed and/or fabricated to have a shear strength in accordance with the type of hose carrying the coupling member 14a. For example, the ultimate tensile stress to which a particular hose construction may be exposed before damage occurs is a known parameter and in this circumstance the shear pins 38 may be fabricated to shear at a pull force of about 50% of the ultimate strength of the hose. Thus the ears 30a, 30b will remain in their uprighted pull position (1) as long as the stress threshold for the hose is not exceeded, but when it is exceeded the pins 38 shear and the ears rotated to position (2) allowing the pull means to disengage and no damage is done to the hose. To continue the pulling operation, the ears are simply rotated back to position (1) and new shear pins 38 inserted.

A further advantage of the embodiment shown in FIG. 3 should now be obvious. The ears 30a, 30b when not being used to pull the hose, may be rotated to position (3) between the uprights 32, 34 and thus be hidden and out of the way. In this position, the shear pins may be inserted in their hole locations through the uprights 32, 34 and in this manner will hold the ears in position (3) until ready for use.

FIG. 5 illustrates an alternative arrangement wherein ears 30a' and 30b' are mounted between uprights 32', 34' on the female member 14a' but wherein the ears are maintained in their upright pulling position (1) by shear pins 38' that are offset from the pivot pins 36'. In this circumstance the ears may only rotate through a normal angle of 90° from a laydown position (3) to an upright position (1) while the laydown position (2) is met only upon shearing of the pin 38'.

Another embodiment of the invention is illustrated in FIGS. 6 and 7 and in this embodiment the ears 40a, 40b are channeled to have depending legs 42, 44 that ride on either side of a single upright 46 on the coupling member 14b. The description of the operation with respect to the ears 30a, 30b holds true for this embodiment also, being capable of rotation into three positions (1), (2) or (3) as illustrated.

FIG. 8 illustrates another embodiment wherein shear pins 48 are carried in radial extensions 52, 54 of the coupling member 14c. In this embodiment, the pins are oriented radially with respect to the hose axis 50, along a diameter of the coupling member and are of a size to accept the pull means directly thereon. This is in contrast to the embodiments of FIGS. 3 and 5 wherein the pull means engages ears which carry the shear pins transversely of the hose axis. In this embodiment the extensions 52, 54 are configured to form a slot 56, 58 sufficient for receiving the pull connecting means therein with the shear pins 48 being held in a single position by the outward portion of the extension and a pin receiving hole 60 in the coupling member 14c.

While certain representative embodiments and details have been shown for the purpose of illustrating the invention, it will be apparent to those skilled in this art that various changes and modifications may be made therein without departing from the spirit or scope of the invention.

What is claimed is:

1. In a hose coupler including a male member and a female member intercoupled to connect two sections of flexible hose, means on the female member for receiving pull means for pulling the hose in the direction of the coupling of the two members comprising at least two radially extending ears on opposite sides of the female member pivotably mounted to stationary support means on the female member such as to rotate through an angle of at least 90° from a first pull engaging position to a second pull disengaging position in the direction of the coupling, said ears being maintained in the first position by means adapted to shear at a predetermined force threshold imparted on the ear when the hose is pulled, said predetermined force threshold established with respect to the ultimate strength of the hose.

2. The coupler as set forth in claim 1 wherein the ears are mounted to rotate through an angle of 180°.

3. The coupler as set forth in claim wherein the means adapted to shear at a predetermined force comprise shear pins mounted through the stationary support means and the ear when the ear is in its pull engaging position.

4. The coupler as set forth in claim 1 wherein the means adapted to shear comprise shear pins mounted through the stationary support means in a relative position to the ears such that the ears are maintained in an upright pull engaging first position as long as the force threshold on the shear pin is not exceeded.

5. The coupler as set forth in claims 1 or 4 wherein the stationary support means comprises at least two radially extending and parallel positioned uprights carrying an ear between them on a pivot pin.

6. The coupler as set forth in claims 1 or 4 wherein the stationary support means comprises a single radially extending upright and each ear has a pair of legs straddling the upright and maintained in position thereon by a pivot pin mounted through the legs and the upright.

7. The coupler as set forth in claim 4 wherein the shear pins are adapted to shear at a force threshold established with respect to at least 50% but not more than 75% of the ultimate strength of the hose.

8. In a hose coupler including a male member and a female member intercoupled to connect two sections of flexible hose, means on the female member for receiving hose pulling means for pulling the hose in the direction of coupling of the two members comprising at least two radial extensions on opposite sides of the female member, each such extension forming a slot in the direction of the coupling and having a radially oriented shear pin mounted through the extension and the slot and terminated in a pin receiving hole in the female member; said pin slot arrangement adapted for receiving said hose pulling means and the pin adapted to shear at a predetermined hose pulling force establishing a threshold in accordance with the ultimate strength of the hose.

9. The hose coupler as set forth in claim 8 wherein the pin is adapted to shear at approximately 50% of the ultimate strength of the hose.

* * * * *